US007558822B2

(12) United States Patent
Fredricksen et al.

(10) Patent No.: US 7,558,822 B2
(45) Date of Patent: Jul. 7, 2009

(54) ACCELERATING USER INTERFACES BY PREDICTING USER ACTIONS

(75) Inventors: Eric Russell Fredricksen, San Francisco, CA (US); Paul Buchheit, Mountain View, CA (US); Jeffrey Glen Rennie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 811 days.

(21) Appl. No.: 10/882,793

(22) Filed: Jun. 30, 2004

(65) Prior Publication Data

US 2006/0047804 A1 Mar. 2, 2006

(51) Int. Cl.
G06F 15/16 (2006.01)
(52) U.S. Cl. .............. 709/203; 709/217; 709/223; 709/224; 715/501.1; 715/513
(58) Field of Classification Search .......... 709/203, 709/217, 219, 223, 224, 229; 715/501.1, 715/513; 707/3, 5, 10; 711/137
See application file for complete search history.

(56) References Cited

U.S. PATENT DOCUMENTS

| 5,727,129 | A | * | 3/1998 | Barrett et al. ............. 706/10 |
| 5,802,292 | A | * | 9/1998 | Mogul .................... 709/203 |
| 5,835,905 | A | * | 11/1998 | Pirolli et al. ............... 707/3 |
| 5,878,223 | A | * | 3/1999 | Becker et al. ............. 709/223 |
| 5,978,791 | A | | 11/1999 | Farber et al. ............... 707/2 |
| 6,003,030 | A | | 12/1999 | Kenner et al. ............. 707/10 |
| 6,023,726 | A | | 2/2000 | Saksena ................... 709/219 |
| 6,055,569 | A | * | 4/2000 | O'Brien et al. ............ 709/223 |
| 6,108,703 | A | | 8/2000 | Leighton et al. ........... 709/226 |
| 6,182,133 | B1 | | 1/2001 | Horvitz .................... 709/223 |
| 6,338,066 | B1 | * | 1/2002 | Martin et al. ............... 707/10 |
| 6,405,252 | B1 | | 6/2002 | Gupta et al. ............... 709/224 |
| 6,421,726 | B1 | | 7/2002 | Kenner et al. ............. 709/225 |
| 6,484,143 | B1 | | 11/2002 | Swildens et al. .............. 705/1 |
| 6,502,125 | B1 | | 12/2002 | Kenner et al. ............. 709/203 |
| 6,553,411 | B1 | * | 4/2003 | Dias et al. ................. 709/219 |
| 6,581,090 | B1 | | 6/2003 | Lindbo et al. ............. 709/217 |
| 6,584,498 | B2 | | 6/2003 | Nguyen ................... 709/219 |

(Continued)

FOREIGN PATENT DOCUMENTS

| EP | 1182589 A2 | 2/2002 |
| GB | 2317723 A | 4/1998 |
| WO | WO 02/100117 A1 | 12/2002 |

OTHER PUBLICATIONS

Yoo, Chin-Woo, "Method and Apparatus for Processing Web Documents", PCT WO 01/5597, Aug. 2, 2001.*

(Continued)

*Primary Examiner*—LaShonda T Jacobs
(74) *Attorney, Agent, or Firm*—Morgan, Lewis & Bockius LLP

(57) ABSTRACT

A client assistant, sometimes called a browser helper, runs on a client computer. The client assistant monitors a user's browsing activities and infers one or more next documents that are most likely to be requested by the user. The client assistant attempts to locate a fresh copy of the inferred next document within a client cache. If a fresh copy of the inferred document is not found in the client cache, the client assistant submits a document download request to a document server.

35 Claims, 5 Drawing Sheets

U.S. PATENT DOCUMENTS

| | | | |
|---|---|---|---|
| 6,625,643 B1 | 9/2003 | Colby et al. | 709/217 |
| 6,665,726 B1 | 12/2003 | Leighton et al. | 709/231 |
| 6,742,033 B1 | 5/2004 | Smith et al. | 709/224 |
| 6,912,591 B2 | 6/2005 | Lash | 709/246 |
| 7,003,566 B2 * | 2/2006 | Codella et al. | 709/224 |
| 7,249,053 B2 * | 7/2007 | Wohlers et al. | 705/14 |
| 2002/0156864 A1 | 10/2002 | Sniest | 709/217 |
| 2003/0101234 A1 * | 5/2003 | McBrearty et al. | 709/218 |
| 2006/0294223 A1 * | 12/2006 | Glasgow et al. | 709/224 |

OTHER PUBLICATIONS

Schilit, B.N., et al., "TeleWeb: Loosely Connected Access to the World Wide Web," 5th Int'l World Wide Web Conference, Paris, France, May 6-10, 1996.

International Search Report, International Application No. PCT/US2005/022067, dated Jan. 10, 2006.

Tait, C.D., et al., "Detection and Exploitation of File Working Sets," *Proceedings of the 11th Int'l Conf. on Distributed Computing Systems*, May 1991, pp. 1-19.

Williams, S., et al., "Removal Policies in Network Caches for World-Wide Web Documents," *Proceedings of ACM SIGCOMM '96 Conf.*, Aug. 1996, pp. 293-305.

Markatos, E.P., et al., "A Top-10 Approach to Prefetching on the Web," *Technical Report No. 173, ICS-Forth*, Heraklion, Crete, Greece, Aug. 1996, pp. 1-15.

Bestavros, A., et al., "Server-initiated Document Dissemination for the WWW," *IEEE Data Engineering Bulletin*, 19(3):3-11, Sep. 1996, pp. 1-8.

Kroeger, T.M., et al., Digital's Web Proxy Traces, ftp://ftp.digital.com/pub/DEC/traces/proxy/webtraces.html, Dec. 1996.

Palmer, M., et al., "Fido: A Cache That Learns to Fetch," *Proceedings of the 17th Int'l Conf. on Very Large Data Bases*, Barcelona, Spain, Sep. 1999, pp. 255-264.

Kimball, T., et al., "Integrated Parallel Prefetching and Caching," *Proceedings of the 1996 ACM SIGMETRICS Int'l Conf. on Measurement and Modeling of Computer Systems*, 1996, pp. 262-263.

Cao, P., et al., "A Study of Integrated Prefetching and Caching Strategies," *Proceeding of 1995 ACM SIGMETRICS*, Jun. 1995, pp. 171-182.

Patterson, R.H., et al., "Informed Prefetching and Caching," *Proceedings of the 15th ACM Symposium on Operating Systems Principles*, Dec. 1995, pp. 79-95.

Griffioen, J., et al., "Reducing File System Latency Using a Predictive Approach," *Proceedings of 1994 USENIX Summer Conf.*, Jun. 1994, pp. 197-207.

Gwertzman, J.S., et al., "The Case for Geographical Push-Caching," *Proceedings on the 1995 Workshop on Hot Operating Systems*, 1995, 5 pages.

Curewitz, K.M., et al., "Practical Prefetching via Data Compression," *Proceedings of the 1993 ACM Conf. on Management of Data (SIGMOD)*, Washington DC, May 1993, pp. 257-266.

Fan, L., et al., "Web Prefetching Between Low-Bandwidth Clients and Proxies: Potential and Performance," *Proceedings of the ACM SIGMET-RICS Conf.*, May 1999, pp. 178-187.

Padmanabhan, V.N., et al., "Using Predictive Prefetching to Improve World Wide Web Latency," ACM SIGCOMM Computer Communication Review, Jul. 1996, 15 pages.

Vitter, J.S., et al., "Optimal Prefetching via Data Compression," *Journal of the ACM*, vol. 43, Sep. 1996, pp. 771-793.

\* cited by examiner

ACCELERATING USER INTERFACES BY PREDICTING USER ACTIONS

RELATED APPLICATIONS

This application is related to U.S. patent application Ser. No. 10/882,794, "System and Method of Accessing a Document Efficiently Through Multi-Tier Web Caching", filed on Jun. 30, 2004, which is hereby incorporated by reference in its entirety.

FIELD OF THE INVENTION

The present invention relates generally to client caches for web browsers and other client applications that access documents from a network, and in particular, to a system and method of expediting a client applications' access to documents stored on a network by predicting a user's next document selection.

BACKGROUND OF THE INVENTION

People routinely download and browse various documents from the Internet through a web browser. These documents include newspaper articles, financial information, medical records, etc. Ideally, when a user clicks on a hyperlink to a document (e.g., while viewing another document using a web browser or other client application) the associated document should be downloaded and rendered instantaneously. Practically, there is always a latency between the moment the user clicks on the hyperlink to a document and the moment the document is completely rendered in the web browser (or other client application). Reducing this latency, and making it almost imperceptible for many documents, would be highly desirable.

SUMMARY

A method of expediting a user's access to documents predicts the user's web browsing activities in a client-server based network system and significantly reduces the aforementioned latency.

A client assistant, sometimes called a browser helper, runs on the client computer. The client assistant monitors a user's browsing activities and infers one or more next documents that are most likely to be requested by the user. The client assistant attempts to locate a fresh copy of the inferred next document within its associated client cache. If a fresh copy of the inferred document is not found in the client cache, the client assistant submits a document download request to a document server.

In some embodiments, the client assistant, upon receiving a response to the request, stores the requested document in the client cache. In some instances, the response to the request may include a content difference between a fresh version of the requested document and a stale version of the document in the client cache. In these instances the client assistant regenerates the fresh version of the document from the content difference and the stale version of the document, and then stores the regenerated fresh version of the document in the client cache.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings.

Like reference numerals refer to corresponding parts throughout the several views of the drawings.

DESCRIPTION OF EMBODIMENTS

Figure 1:
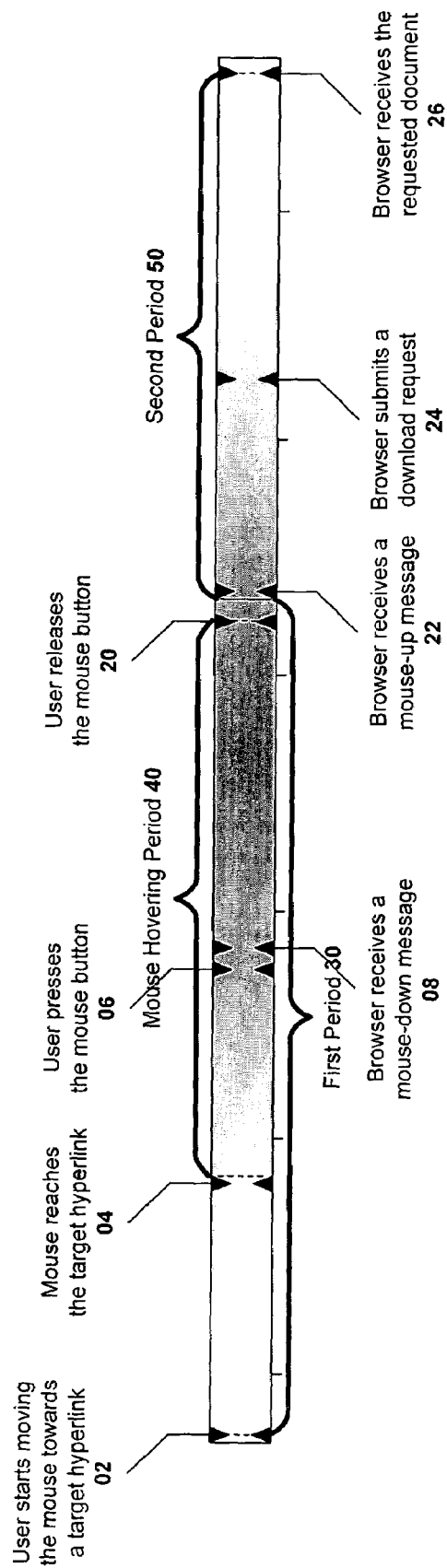
FIG. 1 is a timeline schematically illustrating the operation of a conventional system in which a user downloads a document by clicking through an associated hyperlink in a web browser.

FIG. 1 is a timeline schematically illustrating the operation of a conventional system in which a user downloads a document by clicking on an associated hyperlink in a web browser. The timeline begins when the user starts moving a mouse towards a target hyperlink (02). In this document, whenever the term "mouse" is used, it shall be understood to mean any user-controllable pointer device, including trackball devices, touch pads, joysticks, tablets, gloves, eye movement detectors and the like. Furthermore, the term "mouse pointer" shall be understood to mean any user-controllable pointer or cursor, regardless of the type of device used to control the pointer or cursor. After the mouse reaches the proximity of the target hyperlink (04), the user presses the mouse button (06) and the browser receives a mouse-down message (08). Next, the user releases the mouse button (20) and the browser receives a mouse-up message (22). After receiving the mouse-up message, the browser may first search its local cache for the requested document. If unsuccessful, the browser then submits a document download request (24) to a web server that hosts the requested document and the requested document is subsequently returned to the browser (26).

As discussed in the background section, there is a latency from the moment a user decides to download a document to the moment the document is completely rendered in the web browser. FIG. 1 illustratively depicts that this latency can be further divided into two distinct phases: the first phase (30) begins when the user starts moving the mouse towards the target hyperlink (02) and ends right after the generation of a mouse-up message (20), i.e., after he releases the mouse button within the proximity of the hyperlink, and the second phase (50) starts when the web browser receives the mouse-up message (22) and ends when the document associated with the hyperlink has been rendered in the browser window (26).

Within the first phase, there is often a 200-400 ms "mouse hovering period" (40) that begins when the mouse is on or near the hyperlink (04) and ends right after the user releases the mouse button (20). As shown in FIG. 1, the browser typically does not take any action during this mouse hovering period, since it is not certain if the user would like to download the document associated with the link until the browser receives a mouse-up message.

On the other hand, the browser is able to detect the user's browsing activities during the mouse hovering period, e.g., the position of the mouse over the hyperlink once the mouse reaches the proximity of the hyperlink, when the user presses the mouse button, and when the user releases the mouse button. Thus, if the browser can reasonably infer that the user might want to download the associated document before the mouse hovering period is over, the second phase can be initiated earlier, the aforementioned latency will be shorter, and the user's web browsing speed can be expedited.

In this document, the terms "clicking on" a hyperlink, and "clicking through" a hyperlink both mean pointing to a hyperlink in a document, for instance using a mouse or other user-controllable pointing device, and then both pressing and releasing a button or other actuator. The pressing of the button or actuator is sometimes called a mouse-down action, and the releasing of the button or actuator is sometimes called a mouse-up action. The mouse-up action is the final step of clicking on or clicking through a hyperlink, and in many client applications it is the position of the mouse pointer (also known as the cursor or pointer or user-controllable pointer) at the occurrence of the mouse-up action that determines which hyperlink, if any, the user has selected. A user may request a document for rendering not only by clicking on a hyperlink, but also by specifying a URL, for instance by selecting the URL from a list (e.g., a "favorites list") or even by typing or otherwise entering the URL into the address field of a browser or other application.

Figure 2:
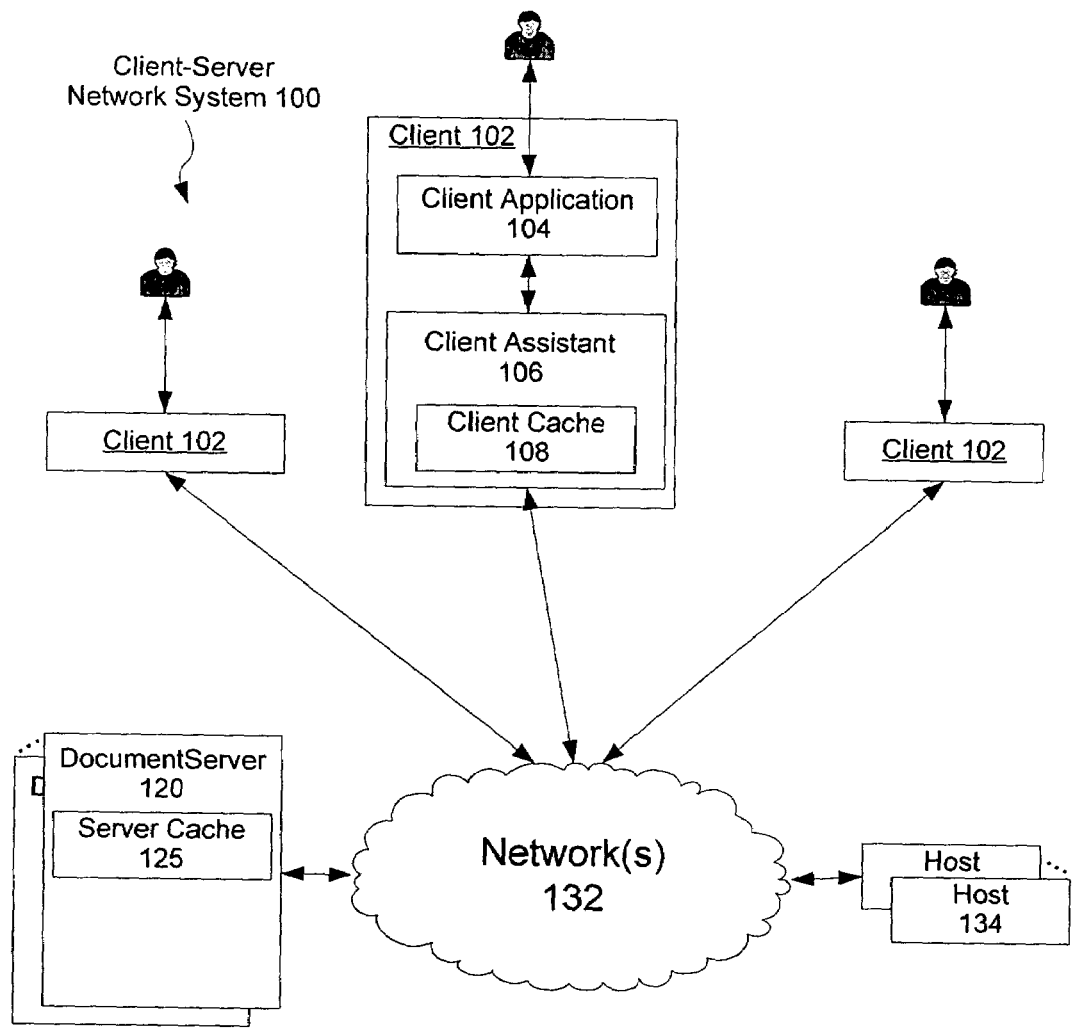
FIG. 2 schematically illustrates a client-server system.

FIG. 2 schematically illustrates a client-server system 100 in accordance with one embodiment of the present invention. The system 100 comprises clients 102, document servers 120, one or more communications networks 132 (e.g., the Internet, other wide area networks, local area networks, metropolitan area networks, and so on), and hosts 134 (e.g., web servers). A client 102 includes at least a client application 104, a client assistant 106 and a client cache 108. The client cache 108 may be implemented in the client 102's permanent storage device, e.g., hard drive, its memory or both. The client application 104 may be a web browser, a document browser, or other program capable of rendering documents and detecting user selection of hyperlinks in documents. The client assistant 106 has (or can establish) one or more communication channels to various document servers 120 and hosts 134 via the communications network 132. As will be explained next, the client assistant 106 plays a role in handling document download requests submitted by a user through the client application 104. The client cache 108 may be a cache that is used solely for caching documents used by the client application 104, or it may be a shared cached for caching documents used by multiple applications and/or multiple users of the client computer 102.

A document server 120 includes at least a server cache 125. In some embodiments, the document server 120 and/or the server cache 125 are deployed over multiple computers in order to provide fast access to a large number of cached documents. For instance, the server cache 125 may be deployed over N servers, with a mapping function such as the "modulo N" being used to determine which cached documents are stored in each of the N servers. N may be an integer greater than 1, for instance an integer between 2 and 1024. For convenience of explanation, we will discuss the document server 120 as though it were a single computer. The document server 120, through its server cache 125, manages a large number of documents that have been downloaded from various hosts 134 (e.g., web servers and other hosts) over the communications network 132.

Each document in the server cache 125 has a content fingerprint that uniquely identifies a particular version of the document and a URL fingerprint (URLFP or URL fingerprint) that uniquely identifies the ultimate source of the document. In some embodiments, the content fingerprint of each version of a document is generated by applying a hash function to the content of the document so as to produce a fixed length value, herein called a content fingerprint. In some embodiments, the content fingerprint of a document is based on the content of the document, including all links and tags in the document, but excluding the content of embedded documents referenced by object tags and the like.

Figure 3A:
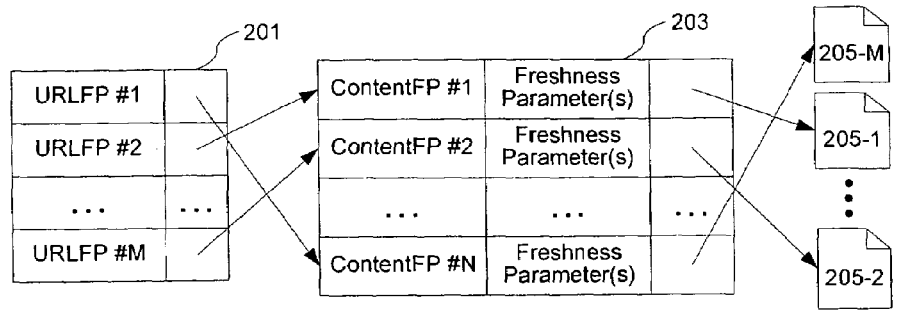
FIGS. 3A, 3B and 3C illustrate data structures associated with a client cache and server cache in the client-server system.
Figure 3B:
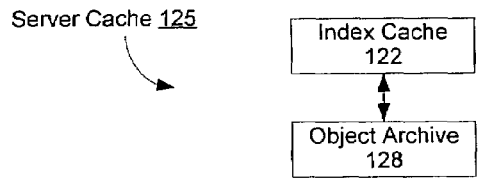
Figure 3C:
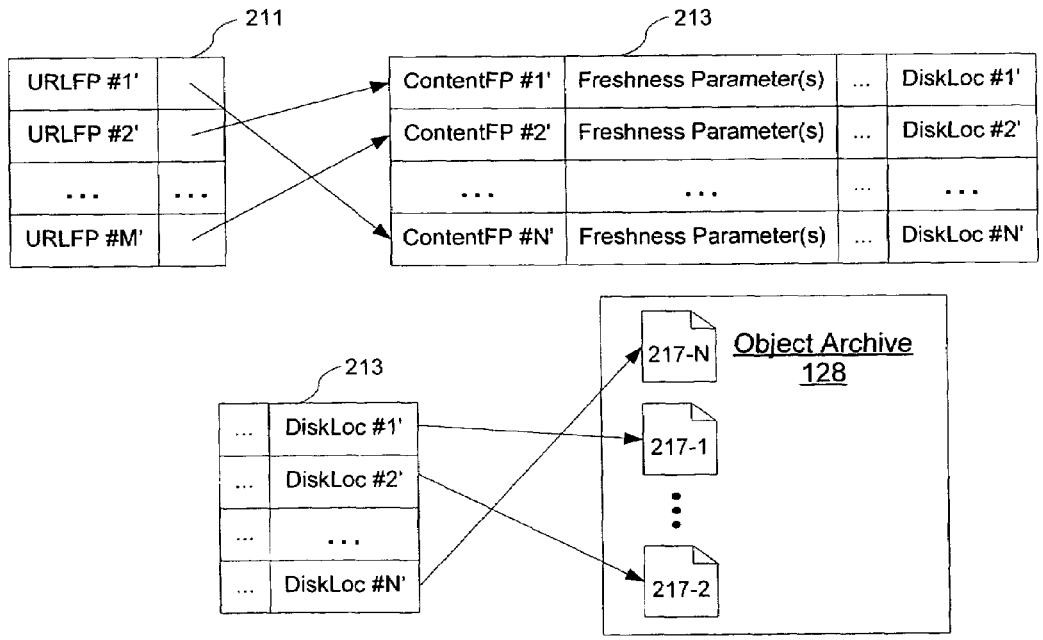

FIGS. 3A, 3B and 3C illustrate client cache and server cache data structures in accordance with some embodiments. In some embodiments, client cache 108 includes a table 201 including a plurality of URL fingerprints. A URL fingerprint is, for example, a 64-bit number (or a value of some other predetermined bit length) generated from the corresponding URL by first normalizing the URL text, e.g., by applying a predefined set of normalization rules to the URL text (e.g., converting web host names to lower case), and then applying a hash function to the normalized URL to produce a URL fingerprint. These URL fingerprints correspond to the documents in the client cache 108. Each entry in the URL fingerprint table 201 has a pointer to a corresponding entry in another table 203 that stores the content of a plurality of documents. Each entry in the table 203 includes a content fingerprint (also known as content checksum), one or more content freshness parameters and a pointer to a copy of the corresponding document (document content 205). In one embodiment, some of the content freshness parameters are derived from the HTTP header associated with the document content. For example, the Date field in the HTTP header indicates when the document was downloaded to the client, and the Expiration field in the HTTP header indicates an expiration date/time assigned to the document by the document's host computer.

Referring to FIGS. 3B and 3C, compared with the volume of documents cached in a client 102, the volume of documents cached in a document server 120 is often significantly larger, because a document server 120 often provides documents to multiple clients 102. As a result, it may not be possible to store all server cached documents in the server's main memory. Accordingly, in some embodiments, information about the cached documents in the server 120 is managed by two data structures, an index cache 122 that is small enough to be stored in the server's main memory to maintain a mapping relationship between a URL fingerprint (table 211) and a content fingerprint (table 213) of a document stored in the server 120, and an object archive 128 that is stored in a secondary storage device, e.g., a hard drive. The records of the index cache 122 may contain pointers to (or disk locations for) document copies in the object archive 128. In some embodiments, one or more additional data structures may be used to map URL fingerprints to content fingerprints and to map content fingerprints do documents in the object archive 128.

In one embodiment, the index cache 122 stores a plurality of records, each record including a URL fingerprint, a content fingerprint and a set of content freshness parameters for a document cached by a document server 120. In some embodiments, the set of freshness parameters includes an expiration date, a last modification date, and an entity tag. The freshness parameters may include one or more HTTP response header fields of a cached document. An entity tag is a unique string identifying one version of an entity, e.g., an HTML document, associated with a particular resource. In some embodiments, each index cache record includes a pointer to the freshest cached version of the document associated with the URL fingerprint. The object archive 128 may also store older cached versions of the same document (i.e., having the same URL fingerprint), but the older versions are not referenced by any entries in the index cache 122.

Client Assistant

Figure 4:
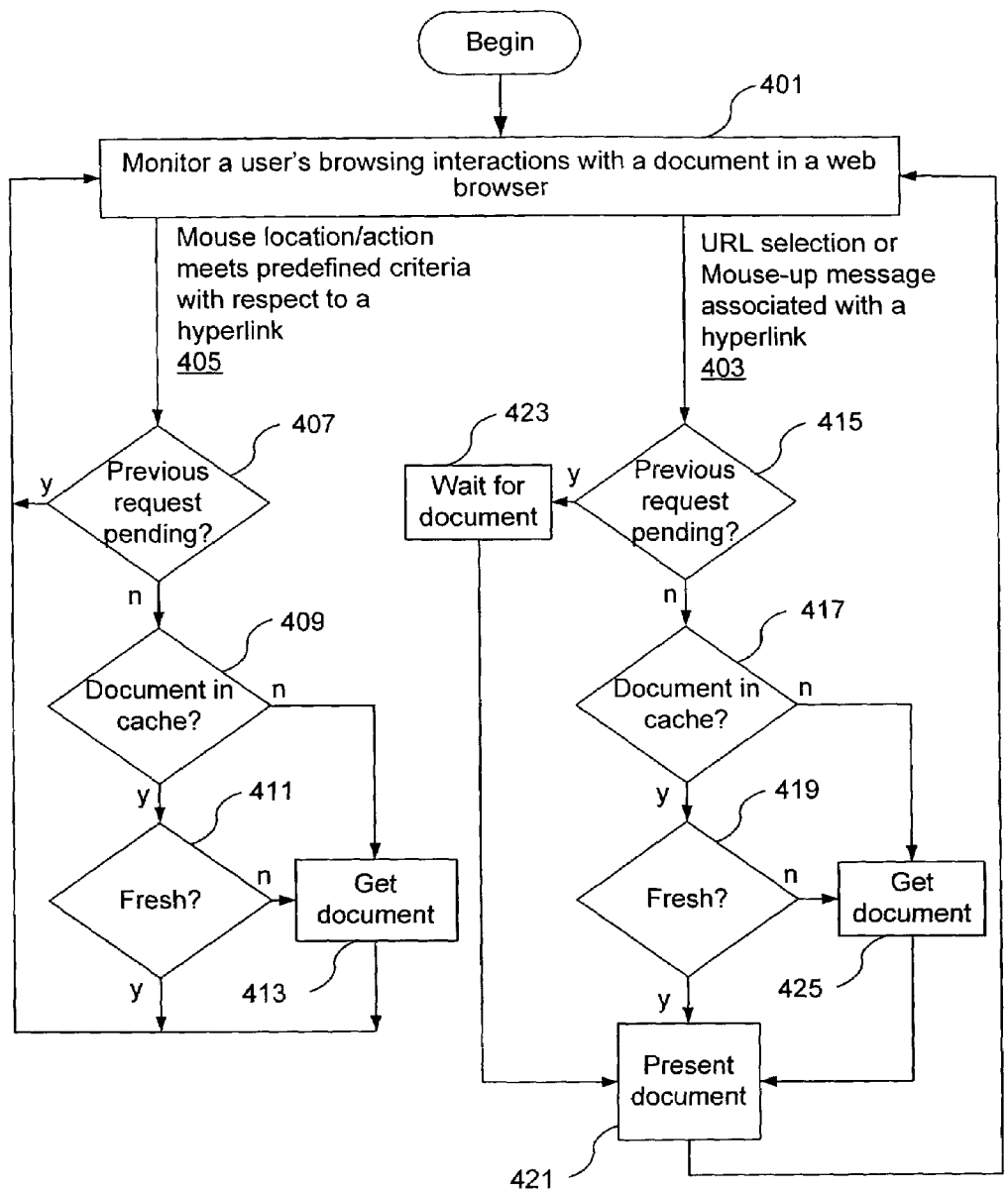
FIG. 4 is a flowchart of a method of reducing document download latency.

Referring to FIG. 4, a user's browsing activities through a client application 104 are monitored by a client assistant 106 (401). When the user's activities with respect to a particular hyperlink meet certain predefined criteria (405), but before the user clicks through or selects a hyperlink (403), the client assistant 106 assumes that the user is likely to download the document associated with the hyperlink. Accordingly, the client assistant 106 identifies a URL corresponding to an identified hyperlink and then determines whether there are any previous requests pending for that URL (407). If a request is currently pending (407-y) then the document associated with the URL is being downloaded and client assistant returns to monitoring the user's activities (401). The client assistant may maintain a record of any pending document requests in its client cache and may thereby determine when a current request matches a pending request. If, however, a request is not pending (407-n), then the client cache 108 is searched for the document (409).

In some embodiments, the identified URL in the hyperlink is converted into a fixed length URL fingerprint (described above), which the client assistant uses to search the client cache 108. If the document is in the cache (409-y), its freshness state is examined (411). If the document is fresh (411-y) then the client application returns to monitoring the user's actions. If the document is not fresh (411-n) or if it had not been found in the cache (409-n), then the document is obtained from the URL identified in the hyperlink or from a document server 120 (413).

The predefined criteria mentioned above are used to make a determination that the user is likely to download the document. Stated another way, the predefined criteria are used to decide when the costs associated with prefetching and preloading one or more documents may justify the latency reduction benefits by obtaining the document(s).

In one embodiment, the predefined criteria for initiating one or more document requests is that the mouse pointer is positioned over or within a predefined proximity of a hyperlink. The predefined proximity may be a rectangular region surrounding the hyperlink, or it may be a region of any other predefined shape surrounding the hyperlink. Alternatively, the client assistant 106 can analyze a current movement of the mouse pointer to predict documents that might be downloaded or into which predefined proximity the mouse pointer is likely to enter. For example, when a user is viewing a downloaded document and wants to view another document represented by a hyperlink in the current downloaded document, the user will move the mouse pointer toward the area of the document containing the hyperlink or hyperlinks in which the user might be interested. In one embodiment, the client assistant 106 samples two or more locations at predetermined time limit intervals and fits a curve to the two or more locations using known curve fitting techniques. Hyperlinks along or within a predefined proximity of the curve are candidates for downloading. Alternatively, a spatial distance between the two or more locations could be taken into account in an attempt to eliminate or reduce the effect of off-route movements. For example, samples would not be used unless the spatial distance between the samples was above a predefined threshold value. Put another way, the route of the mouse pointer can be treated as a light beam that has certain strength and width, both of which are based on measured parameters of the mouse pointer's positions over a period of time. In some embodiments, the client assistant 106 may go ahead preloading documents associated with the candidate hyperlinks even if the mouse has not been physically moved onto any of the hyperlinks. The predefined criteria in this embodiment may be considered aggressive because the user does not even need to position the mouse pointer over a hyperlink to initiate a document request. This embodiment launches inferred document requests very early, and reduces latency commensurately, but at the cost of launching many document requests that are not followed by user clicks on the same hyperlinks.

In a second embodiment, the predefined criteria for initiating a document request is a mouse-down action when the mouse pointer is positioned over a hyperlink. The predefined criteria in this embodiment may be considered conservative, because the inferred document requests are almost always followed by a mouse-up action on the same hyperlink. The latency reduction in this embodiment is modest, typically on the order of 200 milliseconds.

In a third embodiment, the predefined criteria for initiating a document request is that the mouse pointer is positioned over and either hovers over a hyperlink for at least a threshold period of time (e.g., a period of at least 100 milliseconds), or a mouse-down on the hyperlink occurs, which ever is first. This embodiment takes advantage of a common user behavior, which is to do a mouse hover over a hyperlink before clicking on it. In yet other embodiments, other predefined criteria may be used. For instance, the predefined criteria may require a mouse hover, but the hover may be over any region within a predefined proximity of a hyperlink. Further, the predefined criteria may include multiple criteria.

A document in the client cache 108 may be deemed stale, or potentially stale, based on freshness parameters (see FIG. 3A) stored in the client cache 108. A cached document having a host specified expiration date/time is typically determined to be stale when the current date/time is later than the document's expiration date/time. However, many documents do not have a host specified expiration date/time, and for these documents the client assistant may employ a policy for determining which cached documents to treat as stale. For instance, in one embodiment, cached documents that have no specified expiration date/time are always be deemed stale. In another embodiment, documents that have no host specified expiration date/time and that are more than M minutes old are deemed to be stale (where M is any suitable value, such as a value between 5 and 60). In yet another embodiment, the staleness of cached documents having no host specified expiration date/time is based, at least in part, on one or more additional freshness parameters stored in the client cache. In still another embodiment, the staleness of cached documents having no host specified expiration date/time is based, at least in part, on the document type (e.g., html, doc, pdf, etc.).

In one embodiment, a persistent connection is established between the client assistant 106 and the document server 120. This persistent, dedicated connection can effectively reduce client-server communication latency. In one embodiment, the persistent connection includes at least one control stream and multiple data streams per direction.

When the document server responds to the document request (submitted in 413), the client assistant receives the response, and if the response includes a copy of the requested document, the document is stored in the client cache. In some instances, the document copy in the client cache is equivalent to the copy about to be downloaded, in which case the client assistant may update the document's freshness parameters, but does not store a new document in the client cache.

In some embodiments, the response from the document server may include one or more documents embedded within the document identified in the request, and the client assistant stores these additional documents in the client cache as well.

In some embodiments, at 413 the client assistant receives a content difference from the document server. The content difference represents a difference between a fresh version of the requested document and a stale copy of the document in the client cache. In this case the client assistant regenerates the fresh version of the document using the content difference and the stale copy of the document in the client cache, and then stores the regenerated fresh version of the document in the client cache.

When a user selects a URL for downloading, by clicking through a hyperlink or using any other URL selection mechanism, similar techniques may be used. In particular, the monitoring 401 detects a mouse-up action while the mouse pointer is positioned at or over a hyperlink (403). The monitoring 401 also detects other modes of URL selection, including selection of a URL from a list, such as a favorites list, and user entry of a URL (403). Whenever a URL selection is made, by any means, this is construed as a request to present the document corresponding to the URL. Presenting may be by any number of audio or visual means including, but not limited to, rendering the document on a display or aurally presenting the document to the user. The client assistant responds to the URL selection (403) by determining whether a request for the document is pending (415). If no request is pending (415-*n*), then the client cache is examined for the document (417). If the document was found (417-*y*), then either the prediction made earlier was correct or the document was previously requested. The document is checked for freshness (419), which may include checking for an almost-stale condition as described above. If the document is considered fresh, then it will be presented to the user as described above (421).

Returning to 415, if a previous request was pending (415-*y*), then a previous prediction was correct and there is an on-going process of either identifying the document in the client cache (417) or downloading it from a document server (425). The client assistant waits for the process to be completed (423) and then presents the document to the user (421). Alternatively, the document may be presented to the user as it is received without waiting for the entire document to be downloaded.

If the document was not found in the cache (417-*n*) or the document was found, but was not fresh (419-*n*), then the document is obtained from the document server or web host, as appropriate (425), and which could be in the form of a content difference as described earlier. After the document is obtained, it is presented to the user (421). Alternately, prior to completion of the document download the document is progressively presented to the user as it is received at the client. After the document is presented, the user's activities are monitored for additional actions (401).

In some embodiments, the client assistant may transmit at 423 a message to the document server asking for the previously submitted request to be accorded a high priority or high bandwidth. In these embodiments, responses to inferred document requests are given lower priority than responses to user made document requests.

In some embodiments, at 403, 423 or 425, when the client assistant is responding to a user selection of a hyperlink (or user selection of a URL), if the client assistant is in the midst of receiving one or more documents other than the document corresponding to the user selected hyperlink or URL, the client assistant sends a request to the server to terminate transmission of the one or more documents. In particular, if a document is being received in response to an inferred document request which turns out to be a false prediction of which hyperlink or URL the user would select, continued transmission of the document would actually increase the latency associated with rendering the document corresponding to the user selected hyperlink or URL. Therefore the client assistant terminates the document download.

Figure 5:
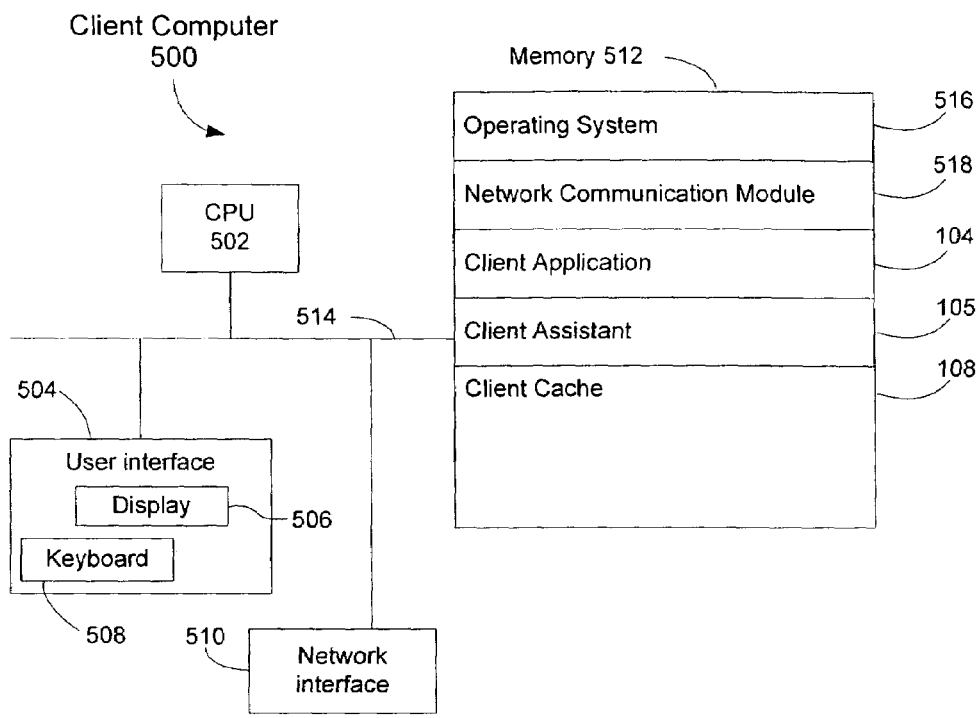
FIG. 5 depicts a client computer having a client assistant for reducing document download latency.

FIG. 5 depicts a client computer 500 in accordance with one embodiment of the present invention. The computer 500 includes one or more processing units (CPU's) 502, one or more network or other communications interfaces 510, memory 512, and one or more communication buses 514 for interconnecting these components. The client computer 500 typically includes a user interface 504, which may include a display device 506 and a keyboard and/or mouse 508. Alternately, the user interface 504 may have other devices for rendering documents and enabling a user to select hyperlinks embedded in documents. Memory 512 may include high speed random access memory and may also include non-volatile memory, such as one or more magnetic disk storage devices. The memory 512 preferably stores:

- an operating system 516 that includes procedures for handling various basic system services and for performing hardware dependent tasks;
- a network communication module (or instructions) 518 that is used for connecting the client computer 500 to other computers via the one or more communication network interfaces 510 (wired or wireless), and one or more communications networks;
- client application (or instructions) 104, such as a web browser, as described above;
- a client assistant module (or instructions) 106, as described above; and
- a client cache 108, as described above.

Document Server

The above discussion focuses on the operation of the client assistant. The following is a brief description of how the document server responds to a document request. For a more complete discussion of the operation of the document server, see related U.S. patent application Ser. No. 10/882,794, "System and Method of Accessing a Document Efficiently Through Multi-Tier Web Caching", filed Jun. 30, 2004, which is hereby incorporated by reference.

In some embodiments, upon receipt of the document request, the document server 120 first queries its associated index cache 122 for any record matching the hyperlink's URL fingerprint. If an entry is identified in the index cache 122 and the associated document's content in the object archive 128 is deemed fresh, the document server 120 sends the cached document to the client assistant 106. Therefore, if the user indeed clicks through the hyperlink, such a request for the associated document can be more promptly served since the associated document will have already been completely or partially cached in the client cache 108. In any case, latency will be reduced by at least the amount of time between the time the document request was sent by the client assistant 106 and the time the user clicked on the hyperlink. The latency reduction will typically average at least 0.20 seconds, and in for many users will average at least 0.4 seconds.

If no entry is found in the index cache 122 or if the cached document in the object cache 128 is deemed stale, the document server 120 submits a document download request to a web server 134 hosting the associated document. Alternately, the document server 120 may attempt to obtain a fresh copy of the document from another source, such as the repository of a search engine. In either case, if the document server locates a copy of the document that is deemed fresh, or that is fresher than the copy (if any) in the client cache, then the document server returns the located copy of the document to the client assistant.

In some embodiments, the document server sends the client assistant a content difference, representing a difference between the requested document and a stale copy of the document in the client cache. In the context of the present discussion, "sending a document from the document server to the client assistant", can be accomplished in two or more ways, including sending the entire document, sending a content difference, or even sending a sequence of two or more content differences, where each content difference represents a difference between two versions of the requested document.

Figure 6:
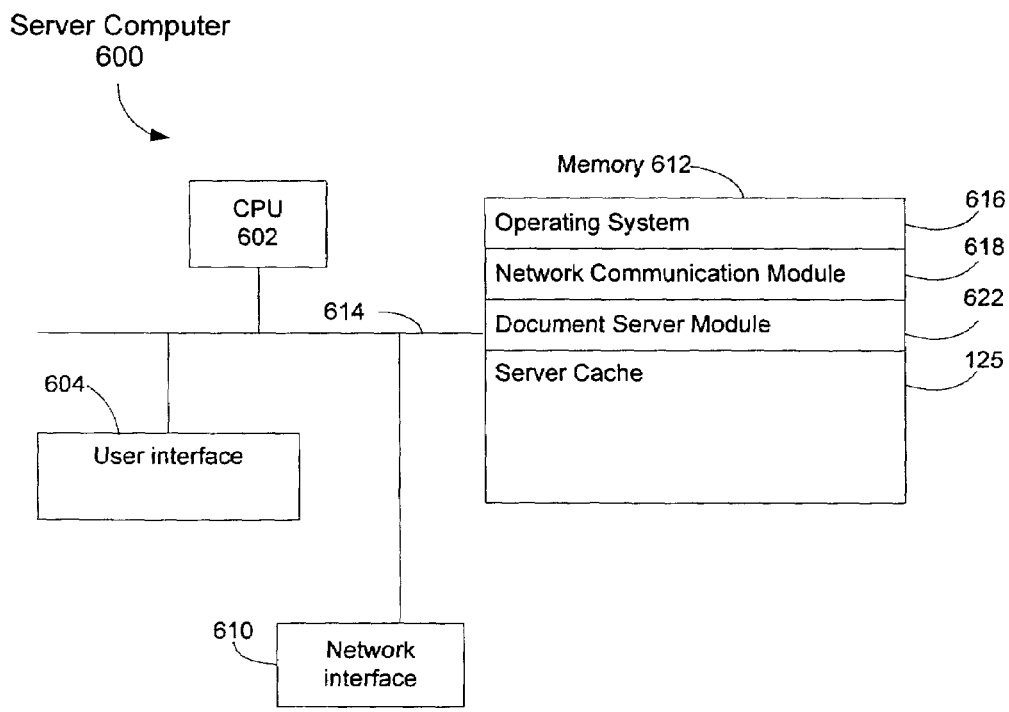
FIG. 6 depicts a server computer having a document server configured to work in conjunction with the client assistant.

FIG. 6 depicts a server computer 600 in accordance with one embodiment of the present invention, which typically includes one or more processing units (CPU's) 802, one or more network or other communications interfaces 610, memory 612, and one or more communication buses 614 for interconnecting these components. The server computer 800 may optionally include a user interface 604. Memory 612 may include high speed random access memory and may also include non-volatile memory, such as one or more magnetic disk storage devices. The memory 612 preferably stores:

- an operating system 616 that includes procedures for handling various basic system services and for performing hardware dependent tasks;
- a network communication module (or instructions) 618 that is used for connecting the server computer 600 to other computers, e.g., client computers 102, via the one or more communication network interfaces 610 (wired or wireless), and one or more communications networks;
- a document server module (or instructions) 622 for receiving and responding to document download requests from client computers; and
- a server cache 125, as described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for expediting access to a document in a client-server network environment, comprising:
   at a client:
   monitoring a user's browsing activities within a currently displayed document having links to associated documents, including monitoring proximity of a user-controllable pointer to one or more of the links in the currently displayed document;
   prior to user selection of any respective link in the currently displayed document:
   identifying a link satisfying predefined criteria, the predefined criteria including proximity criteria with respect to the user-controllable pointer, and
   transmitting to a server a request for a document corresponding to the identified link.

2. The method of claim 1, wherein the transmitting includes transmitting to the server, along with the request for the document, a content identifier of a document stored at the client, the content identifier uniquely identifying a version of the document, corresponding to the identified link, that is stored at the client.

3. The method of claim 2, wherein the content identifier is a content fingerprint.

4. The method of claim 1, further comprising, prior to the transmitting, searching a client cache for the document corresponding to the identified link, and when the result of the search is negative, performing the transmitting.

5. The method of claim 1, wherein monitoring the user's browsing activities within the currently displayed document includes determining whether the user-controllable pointer is positioned over a link in the currently displayed document.

6. The method of claim 1, wherein monitoring the user's browsing activities within the currently displayed document includes determining whether a user-controllable pointer has hovered over a predefined region associated with a link in the currently displayed document for at least a predefined threshold amount of time.

7. The method of claim 1, wherein monitoring the user's browsing activities within the currently displayed document includes determining whether the user-controllable pointer has moved for a predefined period of time or a predefined distance along a trajectory that crosses over or near a link in the currently displayed document.

8. The method of claim 1, wherein monitoring the user's browsing activities within the currently displayed document includes
   sampling two or more pointer locations and fitting a curve to the two or more pointer locations; and
   the predefined criteria includes determining proximity of the curve to a position of one or more links in the currently displayed document.

9. The method of claim 1, including
   receiving a document corresponding to the identified link from the server computer; and
   prior to user selection of the identified link, caching the received document in a client cache.

10. The method of claim 1, including
    receiving a content difference corresponding to a difference between a fresh version of the document corresponding to the identified link and a stale version of the document in a client cache; and
    regenerating the fresh version of the document using the received content difference, and caching the fresh version of the document in the client cache prior to user selection of the identified link.

11. A client computer, comprising:
    one or more processors;
    memory storing one or more programs for execution by the one or more processors;
    a client assistant configured to monitor a user's browsing activities within a currently displayed document having links to one or more associated documents, including monitoring proximity of a user-controllable pointer to one or more of the links in the currently displayed document;
    the client assistant including instructions for identifying a link satisfying predefined criteria, the predefined criteria including proximity criteria with respect to the user-controllable pointer; and
    a communications interface coupled to the client assistant for transmitting to a server, prior to user selection of any respective link, a request for a document corresponding to the identified link.

12. The client computer of claim 11, wherein the one or more programs including instructions to transmit, along with the request for the document, a content identifier of a document stored at the client, the content identifier uniquely identifying a version of the document, corresponding to the identified link, that is stored at the client.

13. The client computer of claim 12, wherein the content identifier is a content fingerprint.

14. The client computer of claim 11, wherein the client assistant is configured to monitor the user's browsing activities within the currently displayed document using a device selected from the group consisting of: a trackball device, a touch pad, a joystick, a tablet, a glove, and an eye movement detector.

15. The client computer of claim 11, wherein the client assistant is further configured to search a client cache for the document corresponding to the identified link, and when the result of the searching is negative, to initiate the transmitting of the request.

16. The client computer of claim 11, wherein the client assistant includes instructions for determining whether a user-controllable pointer is positioned over a predefined region surrounding a link in the currently displayed document.

17. The client computer of claim 11, wherein the client assistant includes instructions for determining whether a user-controllable pointer has hovered over a predefined region associated with a link in the currently displayed document for at least a predefined threshold amount of time.

18. The client computer of claim 11, wherein the client assistant includes instructions for determining whether a mouse-down action has been performed while a user-controllable pointer is positioned over a link in the currently displayed document.

19. The client computer of claim 11, wherein the client assistant includes instructions for determining whether a user-controllable pointer has moved for a predefined period of time or a predefined distance along a trajectory that crosses over or near a link in the currently displayed document.

20. The client computer of claim 11, wherein monitoring the user's browsing activities within the currently displayed document includes
   sampling two or more pointer locations and fitting a curve to the two or more pointer locations; and
   the predefined criteria includes determining proximity of the curve to a position of one or more links in the currently displayed document.

21. The client computer of claim 11, wherein the client assistant includes
   instructions for receiving a document corresponding to the identified link from the server computer; and
   instructions for caching the received document in a client cache of the client computer prior to user selection of the identified link.

22. The client computer of claim 11, wherein the client assistant includes
   instructions for receiving a content difference corresponding to a difference between a fresh version of the document corresponding to the identified link and a stale version of the document in a client cache; and
   instructions for regenerating the fresh version of the document using the received content difference, and caching the fresh version of the document in the client cache prior to user selection of the identified link.

23. The client computer of claim 11, wherein the identified link is a hyperlink embedded in the currently displayed document.

24. A computer readable storage medium storing one or more programs for execution by one or more processors of a client computer, the one or more programs including:
   a client assistant configured to monitor a user's browsing activities within a currently displayed document having links to one or more associated documents, including monitoring proximity of a user-controllable pointer to one or more of the links in the currently displayed document;
   the client assistant including instructions for identifying a link satisfying predefined criteria, the predefined criteria including proximity criteria with respect to the user-controllable pointer; and
   a communications interface coupled to the client assistant for transmitting to a server, prior to user selection of any respective link, a request for a document corresponding to the identified link.

25. The computer readable storage medium of claim 24, wherein the one or more programs includes instructions to transmit, along with the request for the document, a content identifier of a document stored at the client, the content identifier uniquely identifying a version of the document, corresponding to the identified link, that is stored at the client.

26. The computer readable storage medium of claim 25, wherein the content identifier is a content fingerprint.

27. The computer readable storage medium of claim 24, wherein the client assistant is further configured to search a client cache for the document corresponding to the identified link, and when the result of the searching is negative, to initiate the transmitting of the request.

28. The computer readable storage medium of claim 24, wherein the client assistant includes instructions for determining whether a user-controllable pointer is positioned over a link in the currently displayed document.

29. The computer readable storage medium of claim 24, wherein the client assistant includes instructions for determining whether a user-controllable pointer is positioned over a predefined region surrounding a link in the currently displayed document.

30. The computer readable storage medium of claim 24, wherein the client assistant includes instructions for determining whether a user-controllable pointer has hovered over a predefined region associated with a link in the currently displayed document for at least a predefined threshold amount of time.

31. The computer readable storage medium of claim 24, wherein the client assistant includes instructions for determining whether a mouse-down action has been performed while a user-controllable pointer is positioned over a link in the currently displayed document.

32. The computer readable storage medium of claim 24, wherein the client assistant includes instructions for determining whether a user-controllable pointer has moved for a predefined period of time or a predefined distance along a trajectory that crosses over or near a link in the currently displayed document.

33. The computer readable storage medium of claim 24, wherein the client assistant includes
   instructions for sampling two or more pointer locations and fitting a curve to the two or more pointer locations; and
   the predefined criteria includes determining proximity of the curve to a position of one or more links in the currently displayed document.

34. The computer readable storage medium of claim 24, wherein the client assistant includes instructions for receiving a content difference corresponding to a difference between a fresh version of the document corresponding to the identified link and a stale version of the document in a client cache; and instructions for regenerating the fresh version of the document using the received content difference, and caching the fresh version of the document in the client cache prior to user selection of the identified link.

35. The computer readable storage medium of claim 24, wherein the identified link is a hyperlink embedded in the document.

\* \* \* \* \*